United States Patent
Hartley (10) Patent No.: US 11,943,328 B1
(45) Date of Patent: Mar. 26, 2024

(54) SECURE METHOD AND APPARATUS FOR MIXED CRITICALITY SERVICES DISCOVERY IN A VEHICLE

(71) Applicant: GM GLOBAL TECHNOLOGY OPERATIONS LLC, Detroit, MI (US)

(72) Inventor: Steven Hartley, Pointe-Claire (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/070,760

(22) Filed: Nov. 29, 2022

(51) Int. Cl.
  *H04L 12/24* (2006.01)
  *H04L 41/0803* (2022.01)
  *H04L 67/12* (2022.01)
  *H04L 69/22* (2022.01)

(52) U.S. Cl.
  CPC .............. *H04L 69/22* (2013.01); *H04L 67/12* (2013.01)

(58) Field of Classification Search
  CPC ................................ H04L 69/22; H04L 67/12
  USPC ......................................................... 709/230
  See application file for complete search history.

(56) References Cited

U.S. PATENT DOCUMENTS

| | | | | |
|---|---|---|---|---|
| 7,331,049 | B1 * | 2/2008 | Jin | G06Q 10/107 709/201 |
| 2019/0082381 | A1 * | 3/2019 | Thanayankizil | H04W 4/02 |
| 2021/0160315 | A1 * | 5/2021 | Linn-Moran | G07C 5/008 |
| 2021/0218692 | A1 * | 7/2021 | Higuchi | H04W 4/46 |
| 2021/0409335 | A1 * | 12/2021 | Zhu | H04L 47/24 |
| 2022/0250636 | A1 * | 8/2022 | Ucar | B60W 50/06 |
| 2023/0090242 | A1 * | 3/2023 | Duplys | H04L 12/40 709/224 |
| 2023/0176577 | A1 * | 6/2023 | Ditty | G05D 1/0248 701/23 |

\* cited by examiner

*Primary Examiner* — Ario Etienne
*Assistant Examiner* — Elizabeth Kassa
(74) *Attorney, Agent, or Firm* — Quinn IP Law (57) ABSTRACT

A vehicular communication controller includes a microcontroller (MCU) located within a vehicle to generate, by a software component, a find service request to discover an offered service from one or more systems on a chip (SoC). The MCU may generate a service message packet that includes the find service request inserted into a payload of the find service message packet where the payload is bound to an automotive/embedded communication protocol. Using unicast or multicast, the find service message packet may be sent to one or more SoC receiving devices. The SoC receiving devices may deserialize the header and payload of the find service message packet to retrieve the find service request and generate a service directory message based on service metadata and publish a cloud event including a solicited response that is sent back to the software component.

20 Claims, 7 Drawing Sheets

FIG. 6

SECURE METHOD AND APPARATUS FOR MIXED CRITICALITY SERVICES DISCOVERY IN A VEHICLE

INTRODUCTION

Wireless communications are a ubiquitous part of everyday life. Mobile devices, such as smartphones may be used for communication, entertainment, navigation, internet access, and a myriad of other applications. Further, cloud communications are becoming increasingly popular as a cost effective and scalable third-party tool. Cloud communications may provide voice and data communications application and services hosted on servers where a user may only pay for the services or applications they use.

Vehicles are also rapidly integrating ever increasing technological components into their systems. Dedicated special use microcontrollers and technologies such as a system on a chip (SoC) may be used in many different applications in a vehicle. Automotive SoCs and microcontrollers may be utilized in enhancing automated structure that offer state-of-the-art experience and services to the customers, for example in tasks such as body control, camera vision, information display, security, autonomous controls, etc.

However, cloud-based transport protocols, including internet protocols are based on well-established standards that are not necessarily compatible with communications protocols utilized within a vehicle. Thus, the deployment of applications and services with the ability to suppress denial of service attacks, intrusion, and other potential security risks is critical.

SUMMARY

Disclosed herein is a vehicular communication controller apparatus that includes a microcontroller (MCU) located within a vehicle. As disclosed herein, the MCU may desire to discover an offered service from one or more systems on a chip (SoC) where the SoC may be located within or outside of the vehicle. In addition, in the event that a particular service in the MCU is stopped, or newly started, one or more of the SoCs may need to update a particular service's status through the use of a distributed database architecture.

A MCU within a vehicle may need to discover an offered service from one or more SoC based on a find request generated by a software application or component from within the MCU. In such a case the MCU may generate a find service message packet that includes the find service request inserted into a payload of the find service message packet. Then, the payload may be bound to an automotive/embedded communication protocol that supports remote procedure calls, event notifications and underlying serialization/wire format, e.g., a Scalable service-Oriented MiddlewarE over Internet Protocol (SOME/IP). Once bound, the MCU may sends the find service message packet to one or more SoC receiving devices. The one or more SoC receiving devices may then deserialize a header of the find service message packet to generate a generic publish event.

The one or more SoC receiving devices may also deserialize the payload of the find service message packet to retrieve the find service request and determine, based on a local database within the SoC, a corresponding service identifier. The one or more SoC receiving devices may then generate a service directory message based on service metadata from the corresponding service identifier in the local database and publish a cloud event including a solicited response. Once published, the cloud event may then be bound to the header of the automotive/embedded communication protocol and sent back to the MCU. The MCU may then, using an automotive/embedded communication protocol transcoder, remove the header and directs the solicited response to the original software component that generated the initial find service request.

Another aspect of the disclosure may include where the SoC in the apparatus may include storing static automotive services data and associated services capabilities.

Another aspect of the disclosure may include where the apparatus may further include a cloud-based services database.

Another aspect of the disclosure may include where the MCU in the apparatus may generate the find service message packet utilizing a unicast message packet.

Another aspect of the disclosure may include where the MCU in the apparatus may generate the find service message packet utilizing a multicast message packet.

Another aspect of the disclosure may include where the SoC in the apparatus may be located within the vehicle.

Another aspect of the disclosure may include where the apparatus use of the automotive/embedded communication protocol includes scalable service-oriented middleware over IP.

Another aspect of the disclosure may include a vehicular communication controller apparatus that allows one or more SoCs to discover a MCU. This situation may exist when a MCU, located within a vehicle, may execute a runtime environment that may indicate a particular service is started and thus available, or that it may be stopped and thus no longer available. A discovery service within the MCU may generate an offer service based on the indication that the service is started or stopped. The MCU may then bind the offer service to an automotive/embedded communication protocol that supports remote procedure calls, event notifications and underlying serialization/wire format, creating a service discovery message.

The service discovery message may then be broadcast to one or more SoC devices, where the one or more SoC devices may receive the service discovery message, deserialize a header of the service discovery message to generate a generic publish event. The one or more SoC devices may then deserialize a payload of the service discovery message to retrieve the start offer service or the stop offer service, and update a service status in a corresponding local database and a corresponding cloud-based central discovery service database.

Another aspect of the disclosure may include where the vehicular communication controller apparatus may communicate with a central discovery service database to store static automotive services data and associated services capabilities.

Another aspect of the disclosure may include where the broadcast of the service discovery message utilizes a unicast message packet.

Another aspect of the disclosure may include where the broadcast of the service discovery message utilizes a multicast message packet.

Another aspect of the disclosure may include where the SoC of the vehicular communication controller apparatus may be located within the vehicle.

Another aspect of the disclosure may include where the automotive/embedded communication protocol may include scalable service-oriented middleware over IP.

Another aspect of the disclosure may include a method of generating, by a software component in a MCU located within a vehicle, a find service request that may be used to discover an offered service from one or more SoC. Further, the method may include generating, in the MCU, a find service message packet that includes the find service request inserted into a payload of the find service message packet. The payload may then be bound to an automotive/embedded communication protocol that supports remote procedure calls, event notifications and underlying serialization/wire format.

The method may continue by sending, by the MCU, the find service message packet to one or more SoC receiving devices. The one or more SoC receiving devices may deserialize a header of the find service message packet to generate a generic publish event. The method may also include deserializing, by the one or more SoC receiving devices, the payload of the find service message packet to retrieve the find service request and determine, based on a local database and a cloud-based database, a corresponding service identifier. The one or more SoC receiving devices may then generate a service directory message based on service metadata from the corresponding service identifier in the local database or the cloud-based database and publish a cloud event including a solicited response. The method then may include binding, by the one or more SoC receiving devices, the published cloud event to the header of the automotive/embedded communication protocol to generate an event message. The method may then end by sending to the MCU, the event message, wherein an automotive/embedded communication protocol transcoder in the MCU removes the header and directs the solicited response to the software component.

Another aspect of the disclosure may include where the method includes that the local database and the cloud-based database may store static automotive services data and associated services capabilities.

Another aspect of the disclosure may include where the method includes wherein the sending, by the MCU, the find service message packet to one or more SoC receiving devices utilizes a unicast message packet.

Another aspect of the disclosure may include where the method includes wherein the sending, by the MCU, the find service message packet to one or more SoC receiving devices utilizes a multicast message packet.

Another aspect of the disclosure may include where the method includes the SoC being located within the vehicle.

Another aspect of the disclosure may include where the method includes wherein the automotive/embedded communication protocol comprises scalable service-oriented middleware over IP.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
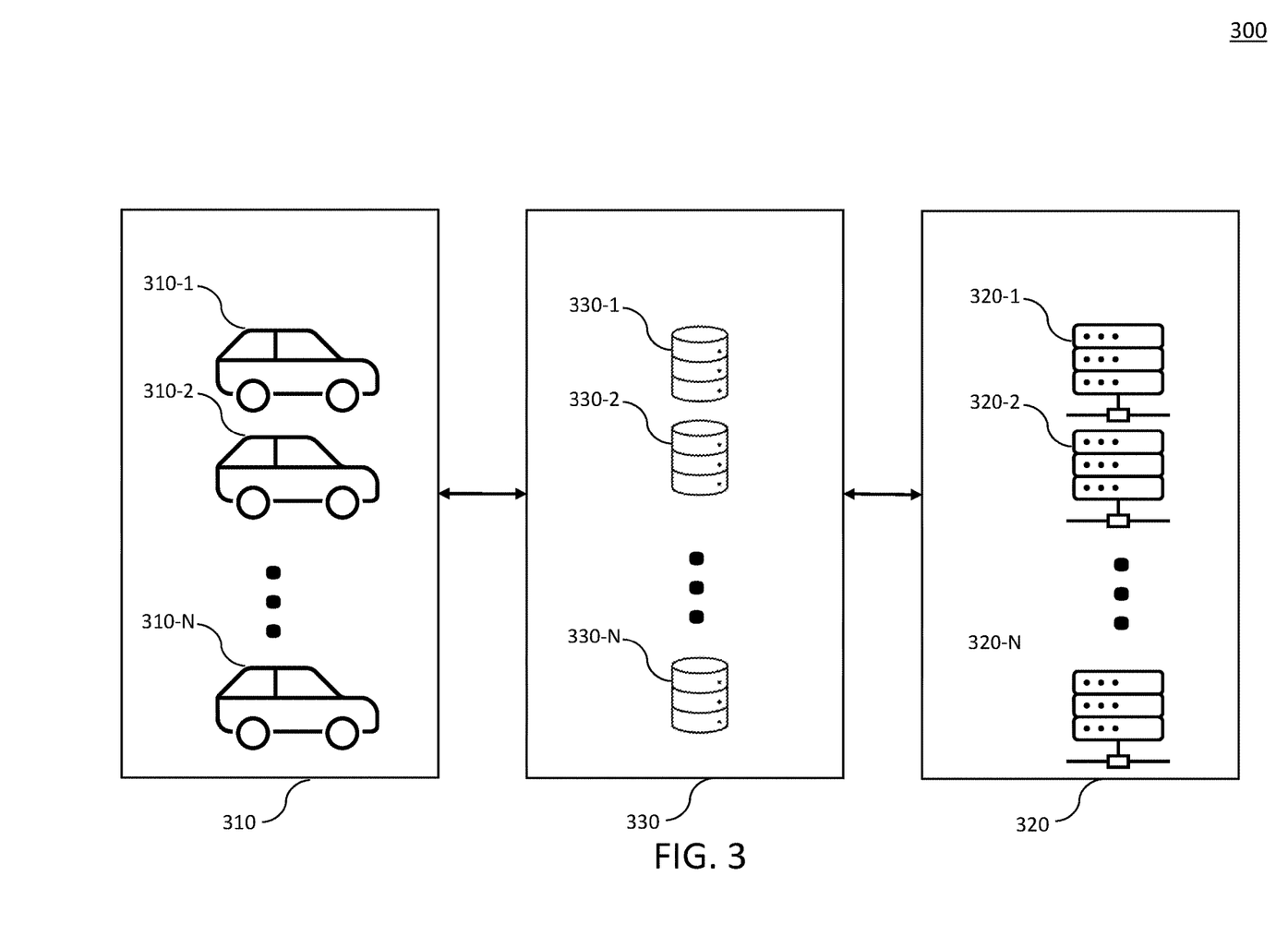
FIG. 3 is an illustration of a cluster publish/subscribe cloud interaction in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Disclosed herein is a vehicular communication controller apparatus that includes a microcontroller (MCU) located within a vehicle. A MCU within a vehicle is typically optimized to perform a particular function very efficiently. Further, a vehicle may contain multiple MCUs, each dedicated to a specialized function, but that are configured to communicate with each other. In the interest of efficiency, the communication protocols used within a vehicle may not be compatible with internet or cloud protocol standards. Such communication between devices, also referred to as D2D (device-to-device), have prompted various vehicle manufacturers to develop their own communications protocols. Further complications arise if a vehicle needs to communicate with an outside source, such as in the use of autonomous vehicles.

Sometimes referred to as Car-2-X applications, these applications require interaction between vehicles and off-board systems. In such situations, an automotive system may need to provide secure on-board communication in addition to support of internet or cloud-based services. In addition, cloud-based services may require dedicated controls for security, such as secure cloud interaction and emergency vehicle preemption along with the ability to support remote and distributed services, such as remote diagnostics, over the air update, repair, and exchange handling.

AUTOSAR™ (AUTomotive Open System Architecture) is a worldwide development partnership of vehicle manufacturers, suppliers, service providers and companies from the automotive electronics, semiconductor and software industry that is attempting to define standards for modularity, configurability, feasibility, producibility, and standardized interfaces.

AUTOSAR™ has proposed an automotive middleware solution that may be used for control messages, referred to as Scalable service-Oriented MiddlewarE over IP (SOME/IP). Unfortunately, the current SOME/IP solution, while directed to compatibility of functionality within the automotive industry, it is not compatible with current Cloud computing protocols.

In a representative use case, a vehicle may have multiple electronic devices controlling a wide variety of functions, for example, driving control systems, entertainment and infotainment systems, environmental controls, etc. Many of these functions depend on communications between other functional modules within the vehicle and outside of the vehicle. For example, there may be a need to dynamically deploy application and services to vehicles using a secure in-vehicle architecture. Typically, services are of mixed criticality. For example, some services may be directed to quality management, while others may be directed to critical systems. For example, in the industry there are automotive safety integrity levels (ASIL) ranging from A to D. D is the highest integrity level indicating a hazardous situation and therefore needs more stringent risk control criteria as compared to an A level. The ASIL ratings may apply to the types of available services. However, currently there is no way for an ASIL rated application or service to securely discover non-ASIL services running on other devices.

Figure 1:
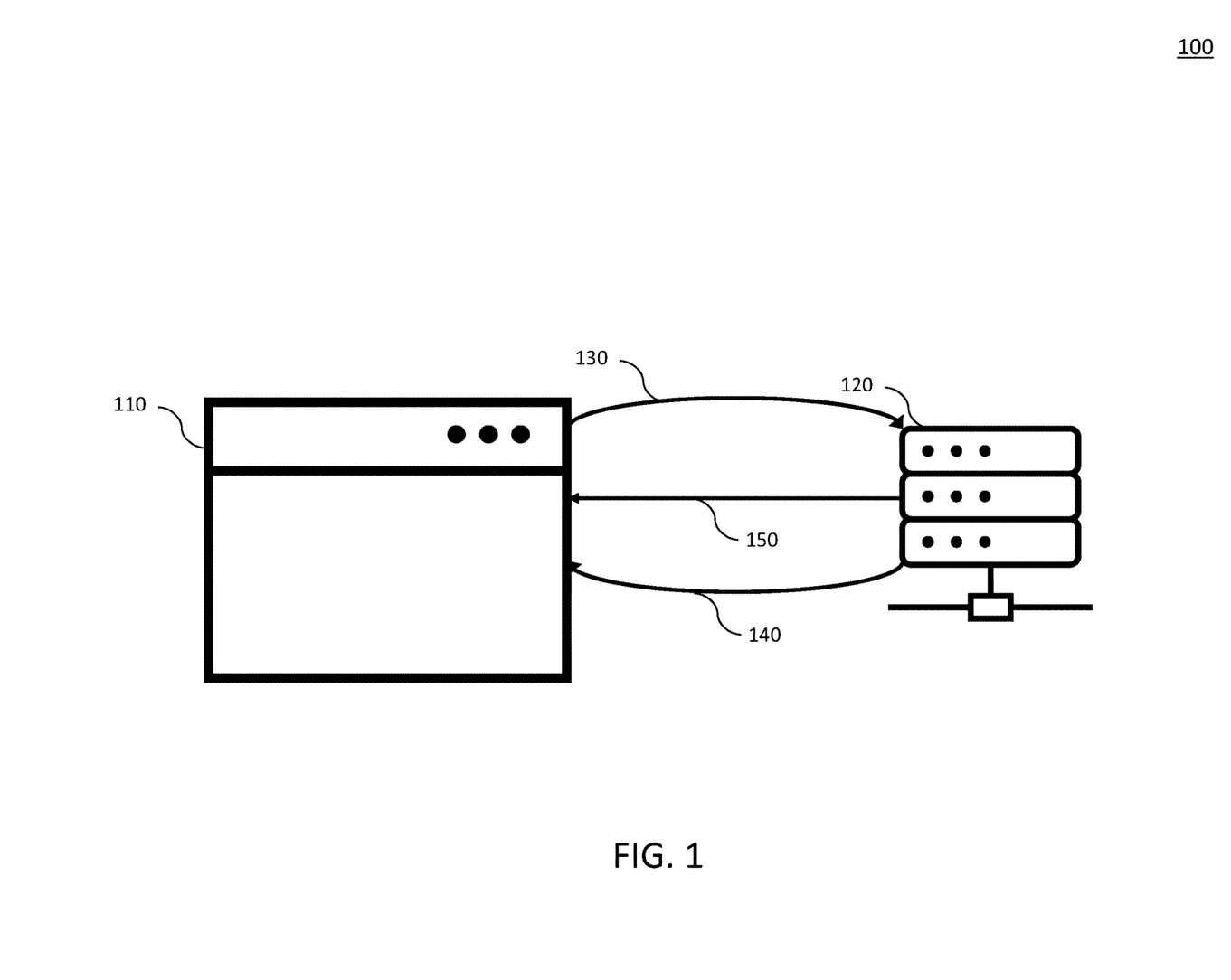
FIG. 1 is an illustration of a request/response web browser/server interaction, in accordance with the disclosure.

FIG. 1 illustrates an example internet web session 100 of transporting data using an http protocol between a server and a web browser, according to an embodiment of the present disclosure. Internet web session 100 includes a web browser 110 and a server 120. Internet web session 100 starts with a request 130 for the web browser 110 to the server 120, where the request specifies the desired action, for example the delivery of a file, such as a video. Server 120 may then send the requested data 150, which for example may be a streaming video file. In addition, server 120 sends a response 140 to the client, for example the web browser 110, that the action it requested has been carried out. In another example, the response 140 may also be to inform the client that an error occurred in processing its request.

Figure 2:
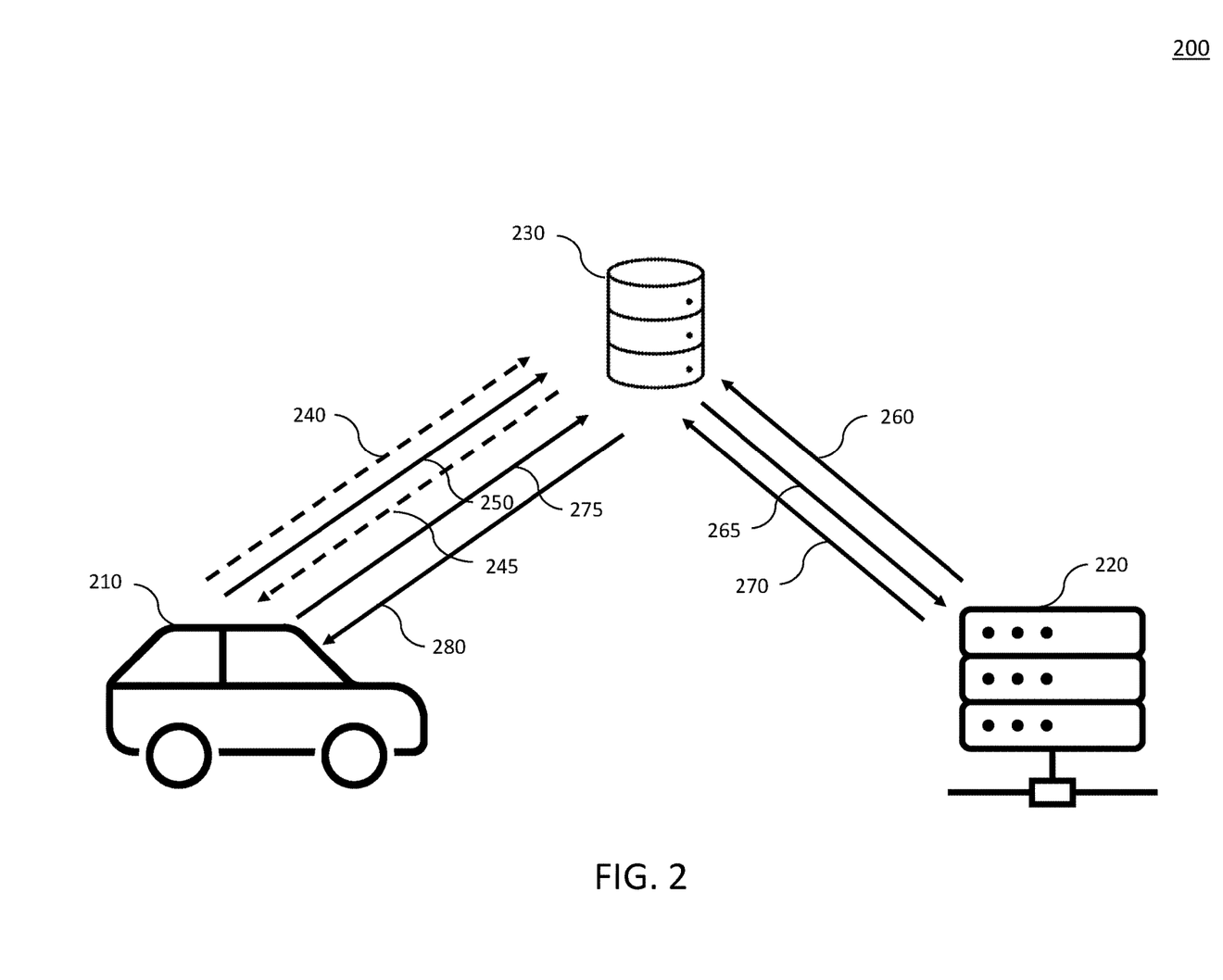
FIG. 2 is an illustration of a publish/subscribe cloud interaction in accordance with the disclosure.

FIG. 2 illustrates a cloud-based publish/subscribe system 200, according to an embodiment of the present disclosure. The cloud-based publish/subscribe system 200 does not utilize the request/response algorithm as described in FIG. 1. Rather, the publish/subscribe system 200 utilizes clients and brokers. For example, publish/subscribe system 200 may include a vehicle cloud client 210, a server cloud client 220, and a broker 230. As an example, the vehicle cloud client may contain sensors and controllers, also referred to as a vehicular communication controller (not shown) that may sense and control the speed of the vehicle. In this example vehicle cloud client 210 intends to send data, e.g., the speed of the vehicle to a recipient, for example the server cloud client 220. However, in the cloud-based publish/subscribe system 200 there is no direct contact between clients, i.e., vehicle cloud client 210 and server cloud client 220, but rather communications are routed through broker 230. The process may be initiated where vehicle cloud client 210 issues a connect message 240 to broker 230. If a connection between vehicle cloud client 210 and broker 230 is possible, broker 230 issues a connect message 245 back to vehicle cloud client 210 to acknowledge and establish a connection. Once the connection is established, vehicle cloud client 210 may then be determined to be a publisher and may send its payload data, such as its speed, to broker 230 shown as publish speed 250, along with other metadata identifying vehicle cloud client 210 as the source.

Once the published speed 250 message is received by the broker 230, which will check to see if there are subscribers for the topic name "speed" exist. In the example, server cloud client 220 is a subscriber 260 for the topic "speed." Therefore, a message with the topic of "speed" received by the broker 230 is sent or published to a subscriber that has subscribed to the "speed" topic. Thus, the speed data of the vehicle cloud client 210 is published as a speed message 265 to server cloud client 220. Server cloud client 220 may also concurrently act as a publisher. For example, given the speed message of the vehicle cloud client, the server cloud client may desire to publish a brake message to slow down the vehicle cloud client. In that example, server cloud client would publish a brake message 270 to broker 230. Vehicle cloud client 210 may be a subscriber for a brake topic 275, in which case vehicle cloud client would receive the published brake message 280 to automatically apply the brakes to slow the vehicle.

FIG. 3 illustrates a large cloud-based publish/subscribe system 300, according to an embodiment of the present disclosure. The cloud-based publish/subscribe system 300 includes vehicle cloud clients 310, shown as vehicle cloud clients 310-1, 310-2, through to 310-N, and server cloud clients 320, shown as server cloud clients 320-1, 320-2, through to 320-N. In addition, the cloud-based publish/subscribe system 300 includes brokers 330, shown as broker 330-1, 330-2, through to 330-N. In an embodiment, vehicle cloud clients 310 are decoupled from server cloud clients 320 and communicate through brokers 330. Thus, communications between clients may be very stable, reliable, and scalable as there is no requirement for direct connections between the clients.

Figure 4:
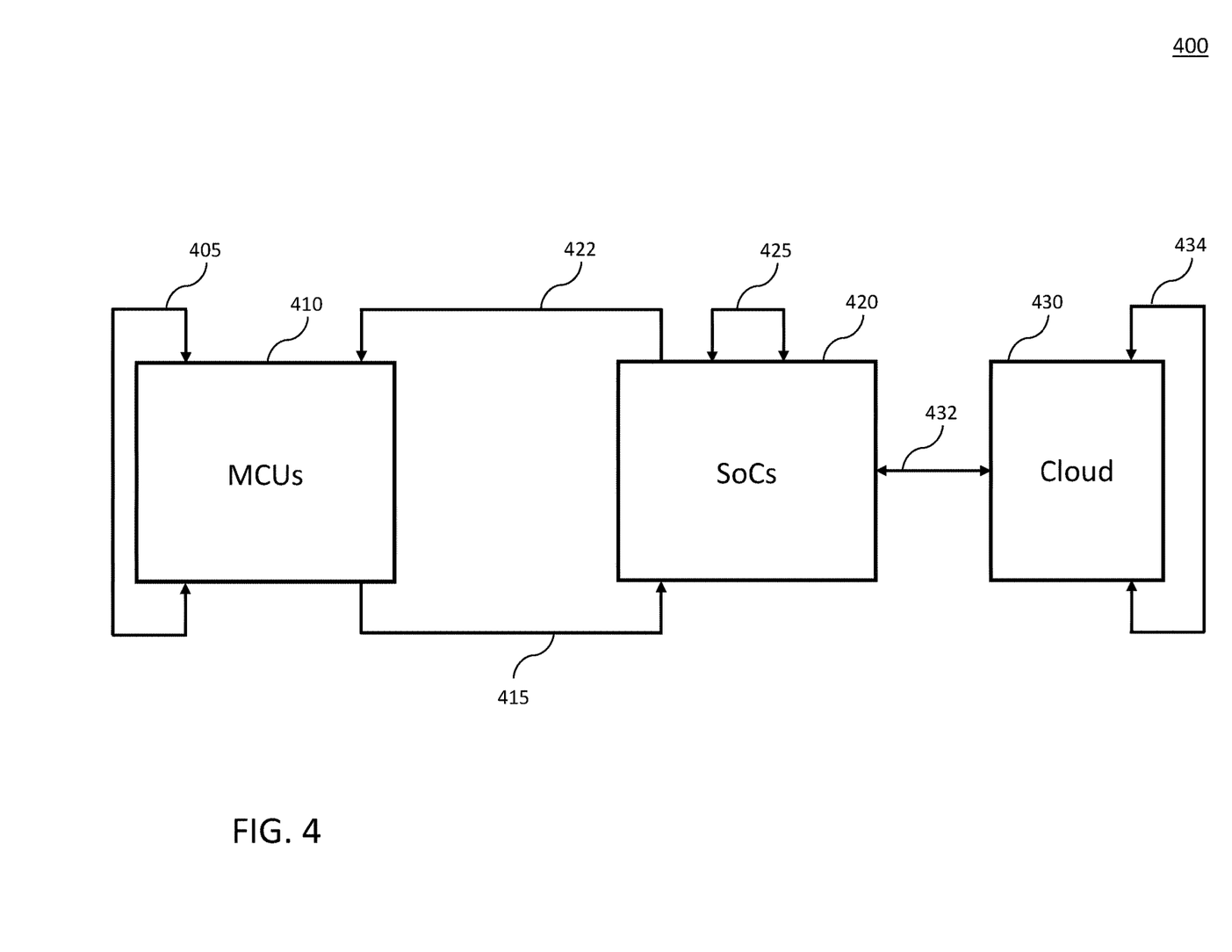
FIG. 4 is an illustration of a MCU to SoC in a find service, offer service, stop service, unicast/multicast communication architecture, in accordance with the disclosure.

FIG. 4 illustrates a MCU to SoC discovery architecture 400, according to an embodiment of the disclosure. Architecture 400 includes a MCU 410, a SoC 420, and a cloud 430. Further, MCU 410 may consist of multiple MCUs, as SoC 420 may represent multiple SoCs. In an embodiment, MCU may also include a software component or application. In one scenario, the software component may issue a command 405, e.g., a "find service" command, to discover a desired service on a device outside of the MCU, for example, at a SoC. In such a scenario a command 415 may be issued from MCU 410 to SoC 420. Command 415 may be a unicast command sent to a single particular SoC, or multicast to multiple SoCs. In an embodiment command 405 and command 415 from MCU 410 may be in an automotive/embedded communication protocol.

Once command 415 is received by SoC 420 it may issue a series of remote procedure calls (RPC) to detect, or discover, if the requested desired service is within SoC 420, shown by RPC 425. SoC 420 may also issue an RPC 432 request to the cloud 430, which may then issue additional RPC 434 discovery requests to other devices connected to the cloud 430. If a discovery request is answered from cloud 430 then an RPC 432 command is returned to SoC 420. In addition, if SoC 420 also, or in addition to cloud 430, identifies a matching available service from within SoC 420, then a unicast command 422 is returned to the original requesting MCU 410. In an embodiment, RPC 425, RPC 432, and RPC 434, may include a cloud-based protocol. As such, SoC 420 would convert the cloud-based protocol packets to an automotive/embedded communication protocol.

Further, in an embodiment, SoC 420 may also include a local database of services. For example, the service may be directed to automotive body parts that may identify the type or assemblies in a vehicle such as doors and windows. In addition, the local database may also contain the capabilities associated with a particular service. Thus, in the case or automotive body parts for a particular vehicle, the metadata associated with that particular vehicle may identify it to include four doors, one windshield, one back window, and one window within each door. In another embodiment, this same type of database may be available in the cloud for access by multiple entities.

Figure 5:
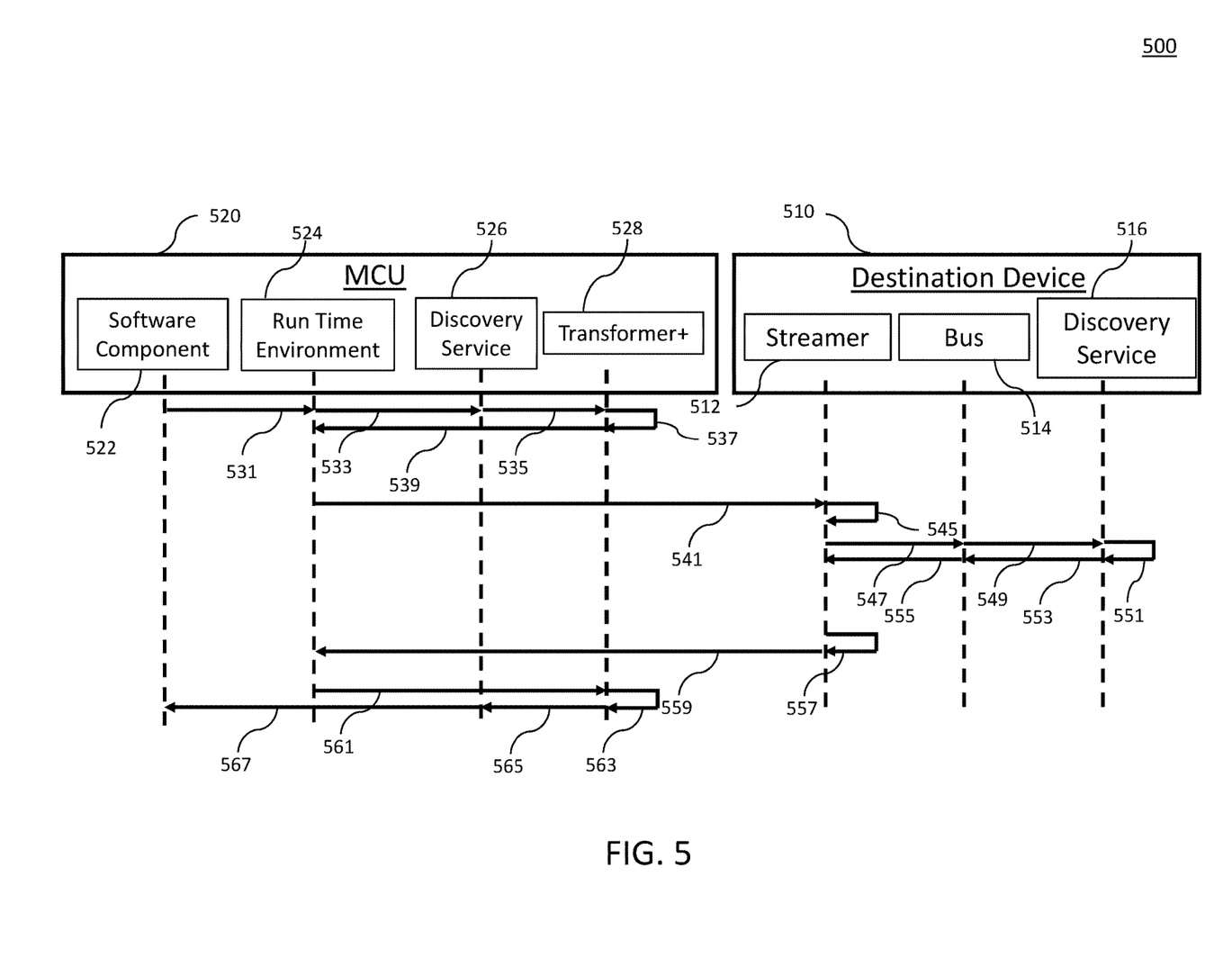
FIG. 5 is an illustration of a Service Discovery Protocol from a MCU, in accordance with the disclosure.

FIG. 5 illustrates a Service Discovery Protocol 500 from a MCU for discovery of one or more SoCs, according to an embodiment of the disclosure. Service Discovery Protocol 500 includes a Destination Device 510 and a MCU 520. A main goal of the Service Discovery Protocol 500 is to communicate the availability of functional entities called services in the in-vehicle communication including the controlling of the send behavior of event messages. Such an approach allows for the sending of just event messages to receivers requiring the service using a Publish/Subscribe approach.

MCU 520 may also include a software component 522, a run time environment 524, a discovery service 526 and a transformer+ 528. The destination device 510, which in some embodiments is an SoC, where the SoC may be the ultimate destination in a string of destination devices, or it may be an intermediary device. Destination device 510 may also include a streamer 512, a bus 514, and a discovery service 516.

Service Discovery Protocol 500 starts with software component 522 determining that communication with a service offered outside of MCU 520 is desired and thus generates find service request 531. In an embodiment, the desired service may be available on an SoC, for example the destination device 510. Find service request 531 may then be directed to run time environment 524. Run time environment 524 may act as a communications bridge, here bridging find service request 531 to discovery service 526 as find service request 533. Discovery service 526 may then integrate the find service request 533 into a payload of a find service message packet, generating find service message packet 535 that may be sent to transformer+ 528.

Transformer+ 528 may bind the payload of the find service message packet 535 to an automotive/embedded communication protocol, for example SOME/IP, at protocol binding 537. The bound message is then returned to run time environment 524 as bound find service message packet 539. Run time environment 524 may then send the bound find service message packet 539 as a multicast packet to multiple destination devices, for example multiple SoCs, or in an embodiment, as a unicast packet to a specific destination device, shown as packet 541.

FIG. 5 illustrates a destination device, which may be a device that is listening for service discovery messages. Further, the destination device may be located within or outside of a vehicle in which the MCU 520 exists. Destination device 510 then receives the packet 541 at streamer 512. Streamer 512 may then deserialize a header of the packet 541 and generate a generic publish event 545 that may be published at 545 to a bus 514 that may be forwarded to discovery service 516 for processing.

Discovery service 516 processing may start with deserializing the payload of the generic publish event 545, for example by using auto-generated helper libraries to retrieve the initial find service request 531. Discovery service 516 may also contain a database, or registry, that may include a listing of service metadata with corresponding service identifiers within destination device 510. Discovery service 516 may then identify a corresponding service identifier associated with the find service request 531. Once located, the discovery service 516 may then generate a service directory message that includes the service metadata from the database. Discovery service 516 may then build a cloud event containing a header and a payload containing a serialized offer service message, which may also be referred to as a solicited response. Discovery service may then publish the solicited response as cloud event 553 to bus 514 that forwards the cloud event as published cloud event 555 to streamer 512. Streamer 512 may then serialize and bind the header of the published cloud event 555 to an automotive/embedded communication protocol, for example SOME/IP, at protocol binding 557, creating solicited response event 559.

Solicited response event 559 may then be sent to MCU 520 and received by run time environment 524, which may then be sent to transformer+ 528 as message packet 561 to remove the header at process 563 and sent to the discovery service 526 as message packet 565 returning the solicited response 567 that may then be directed back to the software component 522, thus completing the discovery request.

Figure 6:
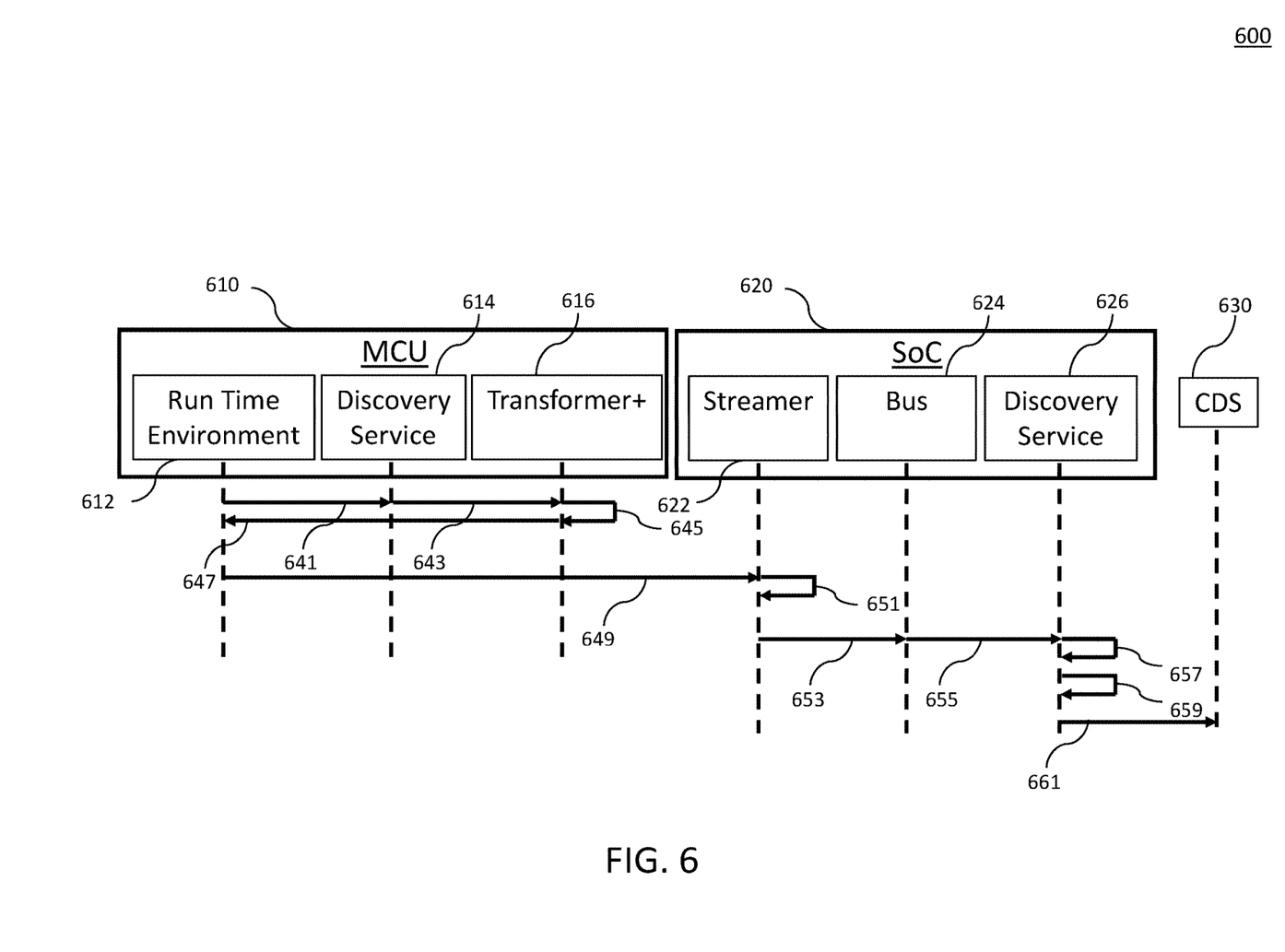
FIG. 6 is an illustration of a Service Discovery Protocol from a SoC, in accordance with the disclosure.

FIG. 6 illustrates a Service Discovery Protocol 600 from a SoC for discovery of one or more MCUs, according to an embodiment of the disclosure. Service Discovery Protocol 600 includes a MCU 610 and a SoC 620. MCU 610 may also include a run time environment 612, a discovery service 614 and a transformer+ 616. The SoC 620, may also include a streamer 622, a bus 624, and a discovery service 626. Service Discovery Protocol 600 may also include a central discovery service 630 located outside the MCU 610 and the SoC 620.

Service Discovery Protocol 600 starts with an indication 641 by run time environment 612 of a change in service status. For example, when a new service becomes available or is started. Or, when an existing service is no longer available, or has been stopped. Indication 641 is received by discovery service 614. Discovery service 614 may then generate offer service message 643. Offer service message 643 may include either that there is a start of a service with a start offer service, or that there is a stopping of a service with a stop offer service, based on the indication 641. The offer service is then sent to transformer+ 616 that may bind the offer service message 643 at binder 645, to an automotive/embedded communication protocol that supports remote procedure calls, event notifications and underlying serialization/wire format, creating a service discovery message 647 that may be sent to the run time environment 612. Run time environment 612 may then send the service discovery message 647 to one or more SoC devices. Run time environment 612 may utilize unicast to send to a particular SoC, or destination, device or through multicast to reach multiple SoCs that may be listening on the multicast port.

The unicast or multicast message 649 may then be received by SoC 620 with streamer 622 that may deserialize a header of the service discovery message at deserializer 651 to determine if the message is indeed a service discovery message. If it is a service discovery message, then it is published as published event 653 to bus 624. Bus 624 may then forward the published event 653 as event 655 to the discovery service 626. Discovery service 626 may then be notified of the event through the listener/callback and deserialize the payload to retrieve the service information at step 657, e.g., the start offer service or the stop offer service.

Once the offer service is retrieved, discovery service 626 may update the service instance information in its local database at 659 or in a cloud-based central discover service, CDS 630 at 661. Further, discovery service 626 may update both its local database and CDS 630 such that the information contained in both is synchronized.

Figure 7:
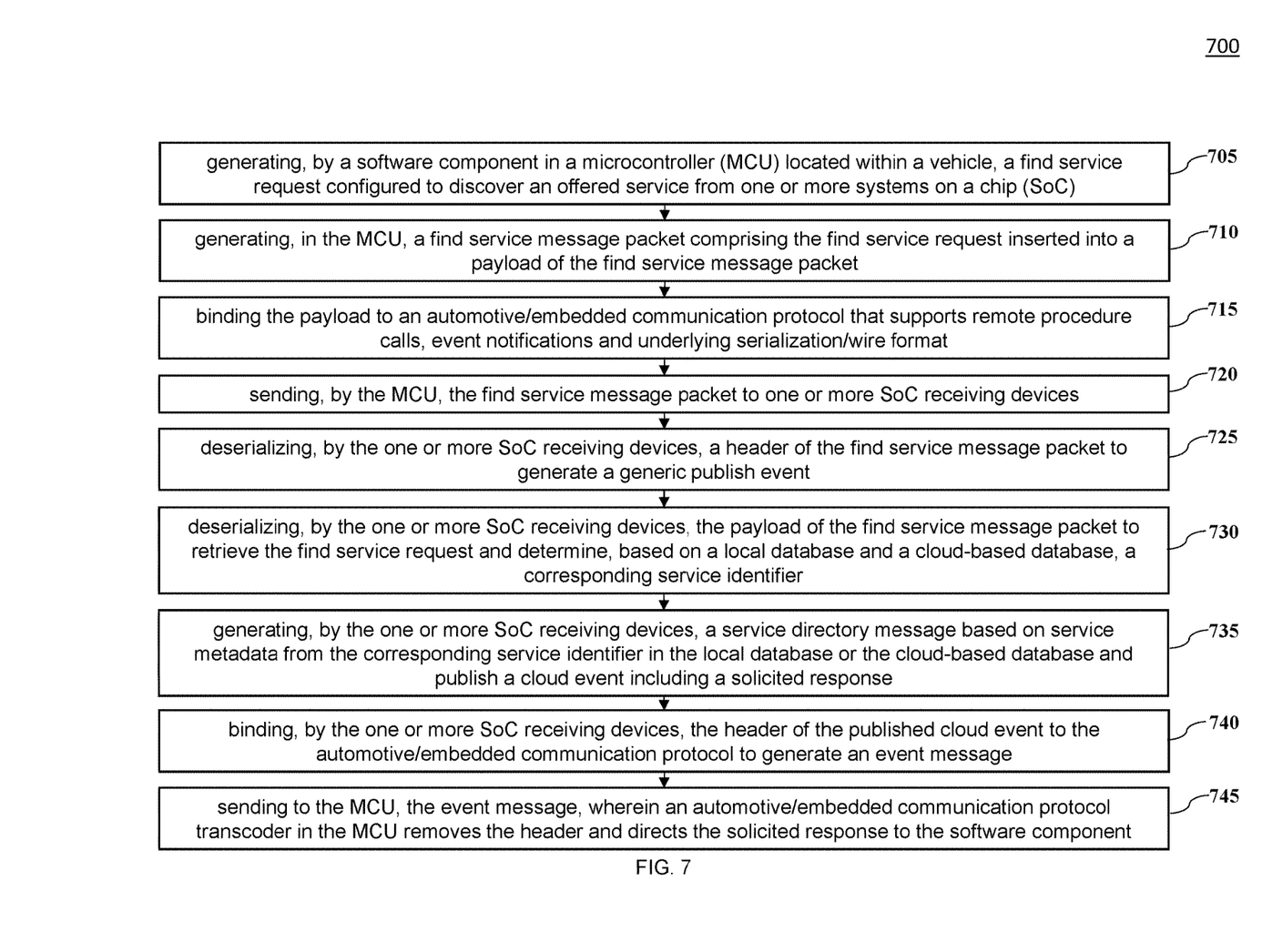
FIG. 7 depicts a flowchart of a method for MCU discovery, in accordance with the disclosure.

FIG. 7 shows an exemplary embodiment of a method for service discovery. Method 700 begins at step 705 with generating, by a software component in a MCU located within a vehicle, a find service request configured to discover an offered service from one or more systems on a chip (SoC). A MCU may need to utilize a service to obtain information, for example static automotive services data and its associated services capabilities. As discussed, discovery may take the form of a MCU discovering SoCs, while it may also take the form of SoCs discovering MCUs. The SoC may be located within the same vehicle as the MCU, or it may be located outside the vehicle. Software component 522 may be a piece of software code or application that is being executed, or could be executed, within a MCU, for example, MCU 520. The software component may issue a find service request if that service is not currently available within the MCU. Thus, in step 705 a find service request may be issued to locate a desired service that may be available on a SoC.

At step 710, a find service message packet is generated, in the MCU, where the find service request is inserted into a payload of the find service message packet. As discussed in FIG. 5, the discovery service 526 within MCU 520 may integrate the find service request 533 into a payload of a find service message packet, thus generating a find service message packet 535.

At step 715 the payload is bound to an automotive/embedded communication protocol that supports remote procedure calls, event notifications and underlying serialization/wire format. As the MCU may be located within a vehicle, it may utilize an automotive/embedded communication protocol, for example SOME/IP.

At step 720 the find service message packet is sent to one or more SoC receiving devices. The sending of the find service message packet may be accomplished using multicast such that the find service message packet is broadcast to multiple SoCs that may be listening on a multicast port. Or, as an alternative the find service message packet may be sent to a particular SoC using unicast.

At step 725 the one or more SoC receiving devices deserialize a header of the find service message packet to generate a generic publish event. At step 730 the payload of the find service message packet is deserialized by the one or more SoC receiving devices to retrieve the find service request and determine, based on a local database and a cloud-based database, a corresponding service identifier. As discussed in FIG. 5, discovery service 516 may also contain a database, or registry, that may include a listing of service metadata with corresponding service identifiers within destination device 510. Further, as discussed in FIG. 6, a central discovery database in the cloud may also exist and contain the same information. Thus, a determination may be made if the desired service is present and the associated capabilities of the service. Further, the databases may store static automotive services data and its associated services capabilities. It is not necessarily meant to store "real time" production data.

At step 735 a service directory message may be generated by the one or more SoC receiving devices. And, based on service metadata from the corresponding service identifier in the local database or the cloud-based database, the SoC may publish a cloud event including a solicited response. For example, discovery service 516 may identify a corresponding service identifier associated with the find service request 531 and that once located, the discovery service 516 may generate a service directory message that includes the service metadata from the database. Discovery service 516 may then build a cloud event containing a header and a payload containing a serialized offer service message, or also referred to as a solicited response. Discovery service may then publish the solicited response as cloud event 553 to bus 514 that forwards the cloud event as published cloud event 555 to streamer 512.

At step 740 the header of the published cloud event is bound to automotive/embedded communication protocol to generate an event message. For example, in FIG. 5, Streamer 512 may then serialize and bind the header of the published cloud event 555 to an automotive/embedded communication protocol, for example SOME/IP, at protocol binding 557, creating solicited response event 559.

At step 745 the event message is sent to the MCU, wherein an automotive/embedded communication protocol transcoder in the MCU removes the header and directs the solicited response to the software component. For example, solicited response event 559 may be sent to MCU 520 and received by run time environment 524, which may then be sent to transformer+ 528 as message packet 561 to remove the header at process 563 and sent to the discovery service 526 as message packet 565. returning the solicited response 567 that may then be directed back to the software component 522, thus completing the discovery request.

Method 700 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A vehicular communication controller apparatus comprising:
   a microcontroller (MCU), located within a vehicle, configured to discover an offered service from one or more systems on a chip (SoC) based on a find service request generated by a software component within the MCU;
   wherein the MCU generates a find service message packet comprising the find service request inserted into a payload of the find service message packet, wherein the payload is bound to an automotive/embedded communication protocol that supports remote procedure calls, event notifications and underlying serialization/wire format;
   wherein the MCU sends the find service message packet to one or more SoC receiving devices;
   wherein the one or more SoC receiving devices deserialize a header of the find service message packet to generate a generic publish event;
   wherein the one or more SoC receiving devices deserialize the payload of the find service message packet to retrieve the find service request and determine, based on a local database, a corresponding service identifier;
   wherein the one or more SoC receiving devices generate a service directory message based on service metadata from the corresponding service identifier in the local database and publishes a cloud event including a solicited response;
   wherein the header of the published cloud event is bound to the automotive/embedded communication protocol and sent to the MCU; and
   wherein an automotive/embedded communication protocol transcoder in the MCU removes the header and directs the solicited response to the software component.

2. The apparatus of claim 1, wherein the local database is configured to store static automotive services data and associated services capabilities.

3. The apparatus of claim 1, further comprising a cloud-based services database.

4. The apparatus of claim 1, wherein the MCU generates the find service message packet utilizing a unicast message packet.

5. The apparatus of claim 1, wherein the MCU generates the find service message packet utilizing a multicast message packet.

6. The apparatus of claim 1, wherein the SoC is located within the vehicle.

7. The apparatus of claim 1, wherein the automotive/embedded communication protocol comprises scalable service-oriented middleware over IP.

8. A vehicular communication controller apparatus comprising:
   a microcontroller (MCU), located within a vehicle, executing a run time environment configured to indicate a service is started and available or is stopped and not available;
   a discovery service within the MCU configured to generate an offer service comprising a start offer service or a stop offer service based on an indication the service is started or stopped;
   wherein the MCU binds the offer service to an automotive/embedded communication protocol that supports remote procedure calls, event notifications and underlying serialization/wire format, creating a service discovery message;
   wherein the service discovery message is broadcast to one or more systems on chip (SoC) devices;
   wherein the one or more SoC devices receive the service discovery message, deserialize a header of the service discovery message to generate a generic publish event; and
   wherein the one or more SoC devices deserialize a payload of the service discovery message to retrieve the start offer service or the stop offer service, and update a service status in a corresponding local database and a corresponding cloud-based central discovery service database.

9. The vehicular communication controller apparatus of claim 8, wherein the central discovery service database is configured to store static automotive services data and associated services capabilities.

10. The vehicular communication controller apparatus of claim 8, wherein the broadcast of the service discovery message utilizes multicast.

11. The vehicular communication controller apparatus of claim 8, wherein the broadcast of the service discovery message utilizes unicast.

12. The vehicular communication controller apparatus of claim 8, wherein the one or more SoC is located within the vehicle.

13. The vehicular communication controller apparatus of claim 8, wherein the one or more SoC is located outside the vehicle.

14. The vehicular communication controller apparatus of claim 8, wherein the automotive/embedded communication protocol comprises scalable service-oriented middleware over IP.

15. A method comprising:
   generating, by a software component in a microcontroller (MCU) located within a vehicle, a find service request configured to discover an offered service from one or more systems on a chip (SoC);

generating, in the MCU, a find service message packet comprising the find service request inserted into a payload of the find service message packet;

binding the payload to an automotive/embedded communication protocol that supports remote procedure calls, event notifications and underlying serialization/wire format;

sending, by the MCU, the find service message packet to one or more SoC receiving devices;

deserializing, by the one or more SoC receiving devices, a header of the find service message packet to generate a generic publish event;

deserializing, by the one or more SoC receiving devices, the payload of the find service message packet to retrieve the find service request and determine, based on a local database and a cloud-based database, a corresponding service identifier;

generating, by the one or more SoC receiving devices, a service directory message based on service metadata from the corresponding service identifier in the local database or the cloud-based database and publish a cloud event including a solicited response;

binding, by the one or more SoC receiving devices, the published cloud event to the header of the automotive/embedded communication protocol to generate an event message; and sending to the MCU, the event message, wherein an automotive/embedded communication protocol transcoder in the MCU removes the header and directs the solicited response to the software component.

16. The method of claim 15, wherein the local database and the cloud-based database are configured to store static automotive services data and associated services capabilities.

17. The method of claim 15, wherein the sending, by the MCU, the find service message packet to one or more SoC receiving devices utilizes a unicast message packet.

18. The method of claim 15, wherein the sending, by the MCU, the find service message packet to one or more SoC receiving devices utilizes a multicast message packet.

19. The method of claim 15, wherein the SoC is located within the vehicle.

20. The method of claim 15, wherein the automotive/embedded communication protocol comprises scalable service-oriented middleware over IP.

* * * * *